(12) United States Patent
Li et al.

(10) Patent No.: US 9,582,334 B2
(45) Date of Patent: Feb. 28, 2017

(54) RESOURCE MANAGEMENT IN MAPREDUCE ARCHITECTURE AND ARCHITECTURAL SYSTEM

(71) Applicant: International Business Machines Corporation, Armonk, NY (US)

(72) Inventors: Li Li, Beijing (CN); Ju Wei Shi, Beijing (CN); Qi Yu, Beijing (CN); Jia Zou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 465 days.

(21) Appl. No.: 14/168,110

(22) Filed: Jan. 30, 2014

(65) Prior Publication Data

US 2014/0215178 A1    Jul. 31, 2014

(30) Foreign Application Priority Data

Jan. 31, 2013    (CN) .......................... 2013 1 0037826

(51) Int. Cl.
*G06F 12/00*    (2006.01)
*G06F 9/50*    (2006.01)

(52) U.S. Cl.
CPC .......... *G06F 9/5066* (2013.01); *G06F 9/5016* (2013.01); *G06F 2209/5017* (2013.01)

(58) Field of Classification Search
CPC ................. G06F 9/5066; G06F 9/5016; G06F 2209/5017
See application file for complete search history.

(56) References Cited

U.S. PATENT DOCUMENTS

| | | | |
|---|---|---|---|
| 8,224,825 B2 | 7/2012 | Wang et al. | |
| 2002/0078213 A1 | 6/2002 | Chang et al. | |
| 2009/0158248 A1 | 6/2009 | Linderman | |
| 2009/0313635 A1 | 12/2009 | Dasdan | |
| 2010/0257198 A1 | 10/2010 | Cohen et al. | |

(Continued)

FOREIGN PATENT DOCUMENTS

| | | |
|---|---|---|
| CN | 102467570 A | 5/2012 |
| CN | 102831102 A | 12/2012 |
| WO | WO 2012111905 | 8/2012 |

OTHER PUBLICATIONS

Dean, Jeffrey, et al., "MapReduce: Simplified Data Processing on Large Clusters," Google, Inc., [http://labs.google.com/papers/mapreduce-osdi04.pdf], OSDI 2004, pp. 1-13.*

(Continued)

*Primary Examiner* — Kalpit Parikh
(74) *Attorney, Agent, or Firm* — Mercedes Hobson

(57) ABSTRACT

A method for resource management in MapReduce architecture. The method includes: determining a ratio r of an input data amount of a Map task and an output data amount of the Map task and an average size R of a record in Map output results; determining a memory size Memory_size that can be allocated to the Map task corresponding to a Map slot; according to the determined r, R and Memory_size, determining an input split size appropriate for the Map task; and allocating an input split with the input split size in a MapReduce job to be processed to the Map task occupying the Map slot. An apparatus for same is also provided.

10 Claims, 7 Drawing Sheets

(56) References Cited

U.S. PATENT DOCUMENTS

2011/0066649 A1 3/2011 Berlyant et al.
2013/0254196 A1* 9/2013 Babu ................ G06F 17/30595
 707/736

OTHER PUBLICATIONS

Rehmann et al., Applications and Evaluation of In-Memory Mapreduce, CLOUDCOM '11 Proceedings of 2011 IEEE Third International Conference on Cloud Computing Technolog, p. 67-74.
Apache Software Foundation, Dynamic Priority Scheduler, Apr. 15, 2012, http://hadoop.apache.org/mapreduce/docs/r0.22.0/dynamic_scheduler.html.
Ayguad'E, et al., Performance Management of Accelerated Mapreduce Workloads in Heterogeneous Clusters, Barcelona Supercomputing Center—Technical University of Catalonia.
McPherson, Data Intensive Analytics with Hadoop: A Look Inside, International Business Machines—Almaden Research Center, Almaden CA, 2010.
Blockley, An Evaluation of the Performance of Parallel Database Operators Using Phoenix Mapreduce, School of Informatics—University of Edinburgh, 2009.

* cited by examiner

200

```
┌─────────────────────────────────────────────────────┐
│ determining a ratio r of an input data amount of a Map task and │ S210
│ an output data amount of the Map task and an average size R of │
│            a record in Map output results           │
└─────────────────────────────────────────────────────┘
                          │
                          ▼
┌─────────────────────────────────────────────────────┐
│ determining a memory size Memory_size that can be allocated │ S220
│      to the Map task corresponding to a Map slot     │
└─────────────────────────────────────────────────────┘
                          │
                          ▼
┌─────────────────────────────────────────────────────┐
│ according to r, R and Memory_size, determining an input split │ S230
│           size appropriate for the Map task         │
└─────────────────────────────────────────────────────┘
                          │
                          ▼
┌─────────────────────────────────────────────────────┐
│    allocating an input split with the input split size in a    │ S240
│  MapReduce job to be processed to the Map task occupying the   │
│                         Map slot                     │
└─────────────────────────────────────────────────────┘
```

```
┌─────────────────────────────────────────────────────┐
│ according to R, memory overhead corresponding to the record, │ S310
│ and Memory_Size, determining a memory size Data_Buffer for │
│                      storing data                    │
└─────────────────────────────────────────────────────┘
                          │
                          ▼
┌─────────────────────────────────────────────────────┐
│   determining the input split size appropriate for the Map   │ S320
│          task according to Data_Buffer and r         │
└─────────────────────────────────────────────────────┘
```

Figure 3

RESOURCE MANAGEMENT IN MAPREDUCE ARCHITECTURE AND ARCHITECTURAL SYSTEM

CROSS-REFERENCE TO RELATED APPLICATIONS

This application claims priority under 35 U.S.C. §119 from China Patent Application No. 201310037826.0 filed Jan. 31, 2013, the entire contents of which are incorporated herein by reference.

BACKGROUND OF THE INVENTION

Field of the Invention

The present invention relates to the MapReduce architecture, and more specifically, to a method and apparatus for resource management in the MapReduce architecture and a MapReduce architectural system having such an apparatus.

Description of Related Art

The MapReduce architecture is a programming model for the parallelized computation of large-scale data sets (larger than 1 TB, for example). MapReduce may distribute large-scale operations on data sets to computing nodes over a network under the control of a master node for distributed processing, so as to improve execution speed and efficiency for the large-scale data sets. The MapReduce may divide a MapReduce job, such as word frequency statistics on a large amount of data, into multiple Map tasks and multiple Reduce tasks, wherein the output of the Map tasks is input to the Reduce tasks.

Currently, the MapReduce architecture has almost 200 systematic parameters. A user may set some or all of these systematic parameters to specify resources available for processing a MapReduce job and how to use these resources. However, the settings of these systematic parameters are determined artificially based on such as experiences of the user, regardless of the processing capacity and/or resource situations of a node. The systematic parameters obtained in this way are usually not optimal. For example, systematic parameters set by a user may lead to some issues including low processing efficiency of a node.

For instance, provided an input split size to be processed by a Map task in the MapReduce is 1000 MB, and its corresponding output data is 300 MB. If the Map task is assigned with 100 MB memory after occupying a Map slot, because the amount of its output data is larger than the memory amount, each record obtained after the Map operation has to be, at first, spilled to a disk as an intermediate result. Then the Map task will fetch the intermediate results from the disk by three times, sort and merge them, and spill a final Map output result to the disk for the access by Reduce tasks.

In this case, due to the overlarge input split of the Map task, the Map output result has a data amount (300 MB) larger than the memory size (100 MB) available for the process of the Map task, causing a problem that the data obtained by performing the Map operation on the input data need to be spilled to the disk at first and a final Map output result can be obtained only after multiple times of repeated read/write processes performed on the disk, which may produce severe impacts on processing efficiency.

SUMMARY OF THE INVENTION

A method and apparatus for resource management in the MapReduce architecture and a MapReduce architectural system are provided in embodiments of this invention, capable of as much as possible avoiding the problem of repeated disk read/write processes caused by the input split size not matching with the memory size for a Map task, so as to improve processing efficiency for the Map task.

According to one embodiment of the present invention, there is provided a method for resource management in the MapReduce architecture, comprising: determining a ratio r of an input data amount of a Map task and an output data amount of the Map task and an average size R of a record in Map output results; determining a memory size Memory_size that can be allocated to the Map task corresponding to a Map slot; according to the determined r, R and Memory_size, determining an input split size appropriate for the Map task; and allocating an input split with the input split size in a MapReduce job to be processed to the Map task occupying the Map slot.

According to another embodiment of the present invention, there is provided an apparatus for resource management in the MapReduce architecture, comprising: a first determination component, configured to determine a ratio r of an input data amount of a Map task and an output data amount of the Map task and an average size R of a record in Map output results; a second determination component, configured to determine a memory size Memory_size that can be allocated to the Map task corresponding to a Map slot; a third determination component, configured to according to the determined r, R and Memory_size, determine an input split size appropriate for the Map task; and a first allocation component, configured to allocate an input split with the input split size in a MapReduce job to be processed to the Map task occupying the Map slot.

According to another embodiment of the present invention, there is provided a MapReduce architectural system comprising the above apparatus.

According to the above technical solutions provided in the embodiments of this invention, by pre-estimating a memory size that can be allocated to a Map task corresponding to a Map slot, an input split with a matched size can be allocated to the Map task occupying the Map slot according to the memory size, so that multiple disk spills caused by an input split size not matching with a memory size as well as repeated disk read/write processes resulted in this case can be avoided as much as possible. Therefore, processing efficiency for the Map task can be improved, and resources waste can be avoided.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 2 is a flowchart of a method for resource management in the MapReduce architecture according to an embodiment of this invention.

FIG. 3 is a flowchart of a method for determining an input split size for a Map task according to an embodiment of this invention.

DETAILED DESCRIPTION OF THE PREFERRED EMBODIMENTS

Figure 1:
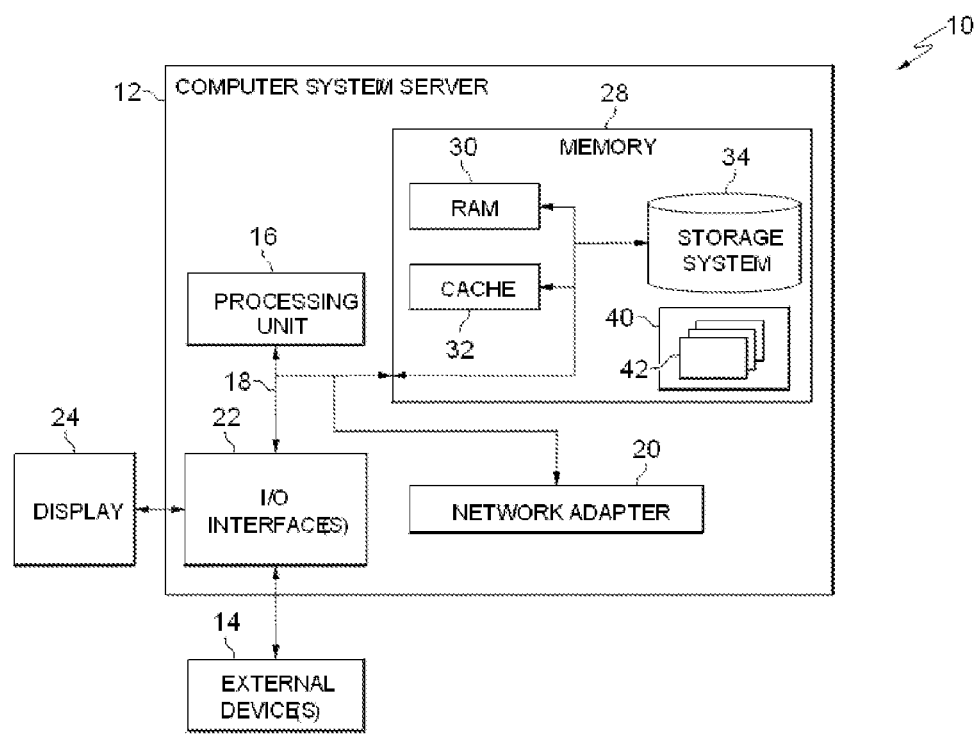
FIG. 1 shows an exemplary computer system/server 12 which is applicable to implement the embodiments of the present invention.
Figure 4:
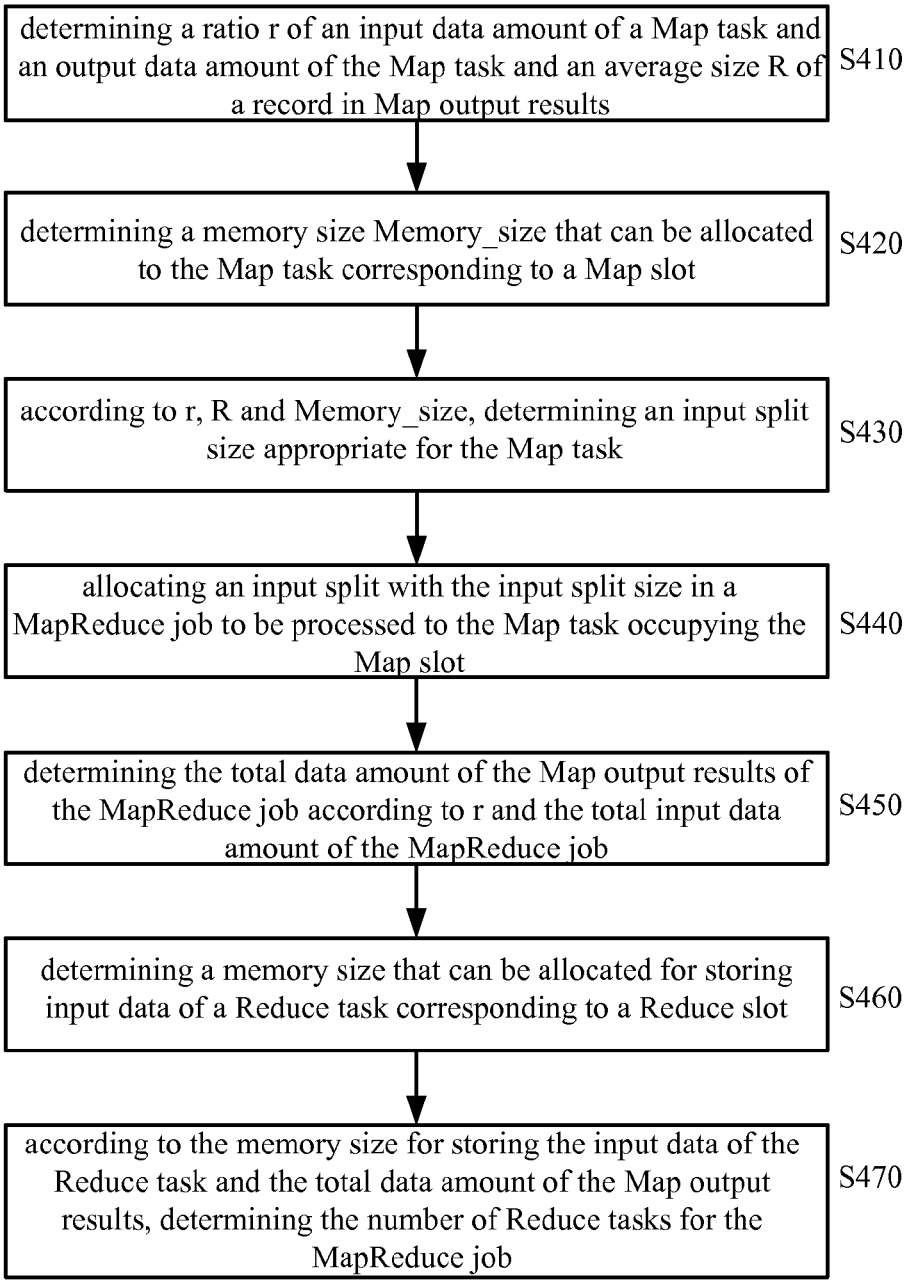
FIG. 4 is a flowchart of another method for resource management in the MapReduce architecture according to an embodiment of this invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

With reference now to FIG. 2, a method 200 for resource management in the MapReduce architecture according to an embodiment of this invention will be described.

As shown in FIG. 2, the method 200 comprises: at S210, determining a ratio r of an input data amount of a Map task and an output data amount of the Map task and an average size R of a record within a Map output result; at S220, determining a memory size Memory_size corresponding to a Map slot that can be allocated to the Map task; at S230, according to the determined r, R and Memory_size, determining an input split size appropriate for the Map task; and at S240, allocating an input split having the input split size in a MapReduce job to be processed to the Map task occupying the Map slot.

The above method 200 can be executed by a master node in a network adopting the MapReduce architecture, or can be executed by a computing node processing a Map task, or can be executed by the master node and the computing node in a coordinated manner. By allocating to a Map task occupying a Map slot an input split with a size matched with a memory size corresponding to the Map slot, repeated disk read/write processes resulted from multiple data spills to disk can be avoided, and thus processing efficiency can be improved.

Herein, a memory corresponding to a slot refers to a memory available to be allocated to a task occupying the slot. Specifically, a memory corresponding to a Map slot represents a memory that can be allocated to a Map task occupying the Map slot, and a memory corresponding to a Reduce slot as described below represents a memory that can be allocated to a Reduce task occupying the Reduce slot.

According to an embodiment of this invention, r which is the ratio of an input data amount of a Map task and an output data amount of the Map task and R which is the average size of a record within Map output results can be obtained in an exploration manner, or can be obtained from historical records.

Specifically, for example, one or more Map tasks can be executed in advance, and r, R can be obtained according to the results upon their execution. The Map tasks that are executed in advance may be Map tasks corresponding to an arbitrary MapReduce job, for example, Map tasks corresponding to a MapReduce job to be processed, or Map tasks composed of test data prepared in advance. Because each Map task usually comprises many records, features of any arbitrary Map task can be substantially characterized by statistic features of one or more Map tasks. It is generally considered that each Mapper (a processor for processing Map tasks) in the MapReduce architecture has substantially the same workload characteristics, different Map tasks have similar ratio relationships between their input data amounts and output data amounts, and each Map output record has a very similar record length. Therefore, it is possible to execute one Map task in advance, to determine r according to an input data amount and an output data amount of the Map task, and to determine R according to an output data amount and the number of output records of the Map task. Wherein, r is equal to the number of input bytes of the Map task divided by the number of output bytes of the Map task, and R is equal to the number of output bytes of the Map task divided by the number of output records of the Map task. It is also possible to execute multiple Map tasks in advance, and take the average of the ratios of input and output data amounts of those Map tasks as r, and take the quotient obtained by dividing the sum of the number of all output bytes of those Map tasks by the total number of their output records as R.

Still as an example, because the MapReduce architecture will produce log information after executing a MapReduce job, r and R can be determined by examining such historical log information. Those skilled in the art may appreciate that after the completion of a MapReduce job, log information containing an input byte number of Map tasks, an output byte number of the Map tasks, a Map output record number, and so on can be obtained by built-in task level counters. An embodiment of this invention takes full advantage of such log information to extract the required r and R. Particularly, r can be obtained by dividing the input byte number of the Map tasks by the output byte number of the Map tasks in the log information, and R can be obtained by dividing the Map output byte number by the Map output record number.

The memory size Memory_Size that can be allocated to a Map task represents, in the case of the Map task occupying a Map slot, the memory size available for processing the Map task corresponding to the Map slot. For example, in Java programming, the memory size that can be allocated to a Map task, a Reduce task, or other task can be represented as JVM_Heap_Size. Certainly, those skilled in the art may understand that the memory size that can be allocated to a Map task can be represented in other parameter forms. Note that the particular representation forms of various parameters herein are merely for a better understanding of this invention by those skilled in the art, and are not intended to be any limitation on the scope of this invention. According to an embodiment of this invention, in the case of applying the MapReduce architecture to a homogeneous network, Memory_Size can be determined according to the total number of slots for concurrent execution of Map tasks and the total memory amount for concurrent execution of Map tasks. For example, first of all, a Map slot capability Mc (i.e., the number of Map tasks that can be executed at one time concurrently) and a Reduce slot capability Rc (i.e., the number of reduce tasks that can be executed at one time concurrently) can be determined according to the core number (for example, CPU). In this case, it can be determined that both Mc and Rc are equal to the core number, i.e., Mc=Rc=the core number. Because a Map task and a Reduce task can be processed on each core at the same time, the number of Map tasks that can be executed at the same time is equal to the core number, and the number of Reduce tasks that can be executed at the same time is also equal to the core number. Then it can be determined Memory_Size=total memory/(Mc+Rc). Herein, the total memory refers to total memory available for the cores described above. For the homogeneous network, it can be deemed that each slot corresponds to the same resource situation. Thus, the memory size that can be allocated to a Map task corresponding to each Map slot is Memory_Size. Therefore, as long as Memory_Size is calculated, the memory size that can be allocated to a Map task corresponding to each Map slot can be obtained.

According to another embodiment of this invention, in the case of applying the MapReduce architecture to a heterogeneous network, in response to a free Map slot, the memory size corresponding to the Map slot can be determined, and the determined memory size is used as Memory_Size. Specifically, because each slot in the heterogeneous network may correspond to a different memory size that can be allocated to a task, the memory size corresponding to a slot has to be determined according to its particular situation, and the determined memory size is used as Memory_Size corresponding to the slot. In the case of a free Map slot, because the resources corresponding to the Map slot have been used for the processing of a Map task previously, the master node and/or the computing node where the Map slot is located in the network knows how many memory the Map slot corresponds to, and thus the memory size available for the processing of a Map task corresponding to the Map slot can be determined accordingly.

After r, R and Memory_Size is determined, an input split size matched with Memory_Size can be determined for a Map task. For example, an input split size Map_input_split_size can be determined by steps S310 and S320 shown in FIG. 3.

At S310, a memory size Data_Buffer which is a portion of the Memory_Size, for storing data other than management overhead, is determined according to R, management overhead corresponding to one record of the Map output result, and Memory_Size.

For example, in the case of executing a Map task, data can be stored in the memory and the disk with a data structure composed of management overhead and a data portion. For example, in an existing MapReduce architecture (such as, the Apache Hadoop MapReduce implementation), the data structure for storing data of a Map task in the memory and the disk can be defined in term of records, and each record may have the same data structure, which comprises 16-byte management overhead and a R-byte data portion. The 16-byte management overhead comprises a 12-byte kvoffsets field and a 4-byte kvindices field. The R-byte data portion is stored in a kvbuffer field. Obviously, the above data structure is merely an example and does not limit the scope of this invention. With the development of techniques, some new fields may be added, and some additional bytes may be occupied.

The byte number M of the management overhead can be determined by the data structure, or can be determined by a data storage specification that is applied. Because R has been determined at S210 by exploration or access to historical information, a percentage of management overhead in a record can be determined as io.sort.record.percent=M/(M+R), or a percentage of data in a record can be determined as R/(M+R). Then, the memory size Data_Buffer for storing data other than management overhead in the memory size Memory_Size of a Map slot can be determined as follows: Data_Buffer=Memory_Size*(1−io.sort.record.percent)= Memory_Size*R(M+R).

At S320, according to Data_Buffer and r, an input split size suitable for a Map task is determined.

Specifically, because the ratio of the input data amount and the output data amount of a Map task has been determined at S210, an input split size suitable for a Map task (i.e., an input data amount suitable for the Map task) can be determined as follows: Map_input_split_size= Data_Buffer*r.

In the case of applying the MapReduce architecture in a homogeneous network, because each Map slot can be considered as being in the same resource situation, the input split size of a Map task that can be processed in each Map slot can be regarded as the same. Thus, after determining Map_input_split_size, the number of Map tasks for a MapReduce job to be processed can be determined according to the total input data amount of the MapReduce job and the input split size of each Map task. That is, the number of Map tasks required by the MapReduce job is equal to the total input data amount of the MapReduce job divided by Map_input_split_size.

It can be determined that the input split size of a Map task obtained from the above method matches with the memory corresponding to the Map slot occupied by the Map task. By allocating data with the split size to the Map task, the problem of spilling each record resulted from the Map operation to a disk several times due to an over-large split size and a too-small memory size can be prevented. That is, with the above method, the problem of repeated disk read/write operations during the execution of a Map task may not occur. At this time, the memory corresponding to the Map slot may store all the records obtained by the Map operation at once, so that only one disk write operation is required (i.e., one spill to disk) to store the Map output result on the disk for the processing of a Reduce task. Thus, processing efficiency can be improved, and resources waste and system overheads caused by multiple disk read/write operations can be avoided.

Although S220 is executed after S210 in the method 200, it is also possible to execute S220 before S210, or execute S220 and S210 concurrently. The present invention does not have limitation about this, so long as S220 and S210 are executed before S230.

According to the above method provided in an embodiment of this invention, by estimating a memory size that can be allocated to a Map task corresponding to a Map slot in advance, the Map task occupying the Map slot can be allocated with a input split in a matched size according to the memory size, so that multiple spills to disk caused by unmatched input split size and memory size as well as repeated disk read/write operations in this situation can be avoided as much as possible, and thus processing efficiency of the Map task can be improved and resources waste can be avoided. Further, parameters including a memory size, a split size, a task number and so on can be automatically obtained in the above method, and can be used to improve processing efficiency. Therefore, automatic parameter optimization can be achieved in the method provided in the embodiment of this invention, and the problem of ineffective resource utilization due to empirical settings or default parameter settings can be avoided.

The resource management method for avoiding, as much as possible, multiple spill-to-disk processes during a Map operation has been described above. However, the problem of unnecessary spill-to-disk processes may occur not only during a Map operation, but also during a Reduce operation, which may also lower processing efficiency. For example, as a result of a Reduce task number setting, the input data amount of a Reduce task may be larger than a memory size, available for storing Reduce task input data, in a Reduce slot occupied by the Reduce task. Because a Reducer (a processor for processing a Reduce task) initiates its process only after all Map output records that are inputted thereto are collected, if the amount of input data inputted to the Reducer is larger than the memory size available for the Reducer, spill to disk is required. Thereafter, by fetching an amount of data that can be processed from the disk multiple times, temporarily storing intermediate results, and then merging and sorting all the intermediate results, data able to be used by a Reduce function can be obtained.

A method 400 according to an embodiment of this invention can be used in order to further avoid a drop in processing efficiency caused by multiple read/write operations resulted from spill to disk processes during a reduce operation. S410 to S440 of the method 400 are substantially the same as S210 to S240 of the method 200, which will not be repeated herein.

At S450, according to r and the total input data amount of the MapReduce job, the total data amount of the Map output results is determined for the MapReduce job.

The total input data amount of the MapReduce job can be determined directly based on the file size corresponding to this MapReduce job. Because r represents the ratio of the input data amount and the output data amount of a Map task, the total data amount of the Map output results (i.e., the total input data amount of the Reduce operation) is equal to the total input data amount of the MapReduce job divided by r.

At S460, a memory size that can be allocated to store input data of a Reduce task corresponding to a Reduce slot is determined.

The total memory corresponding to a Reduce slot not only is used for storing the input data of a Reduce task, but also used for processing these input data and outputting the processing results and so on. Hence, memory for storing the input data of a Reduce task may be a portion of the total memory allocated to the Reduce task occupying the Reduce slot. For a compromise between processing performances of the operation for storing the Reduce input data and other operations including processing the Reduce function and subsequent processes thereof, the percentage of the memory for storing the Reduce input data in the total memory can be set to 0.5. Certainly, the percentage can be set to other values less than 1.

According to an embodiment of this invention, in the case of applying the MapReduce architecture in a homogeneous network, the memory size that can be allocated to store input data of a Reduce task corresponding to a Reduce slot can be determined according to the total number of slots available for the parallelized processing of Reduce tasks, the total memory available for the parallelized processing of Reduce tasks, and a predetermined coefficient less than 1. Wherein, the predetermined coefficient is the ratio of memory in a Reduce slot for storing Reduce input data to the total memory of this slot.

For example, in a homogeneous network, it can be considered that each Map slot and each Reduce slot have substantially the same resource situation. As described above, the memory size that can be allocated to a Map task corresponding to a Map slot is Memory_Size=total memory/(Mc+Rc). In this case, the memory size that can be allocated to a Reduce task corresponding to a Reduce slot is also Memory_Size. Thus, the memory that can be allocated for storing Reduce input data corresponding to a Reduce slot is equal to Memory_Size multiplied by the predetermined coefficient. When the predetermined coefficient is 0.5 for a compromise over the processing performances during the Reduce operation, the memory that can be allocated for storing Reduce input data corresponding to a Reduce slot is equal to 0.5*Memory_Size.

According to another embodiment of this invention, in the case of applying the MapReduce architecture in a heterogeneous network, for each Reduce slot for executing the MapReduce job in the heterogeneous network, the memory size that can be allocated for storing the input data of a Reduce task corresponding to a Reduce slot can be determined according to the memory size that can be allocated to the Reduce task corresponding to the Reduce slot, and a predetermined coefficient less than 1. For example, in a heterogeneous network, a master node and/or a computing node where the Reduce slot is located know the memory size corresponding to the Reduce slot. The memory size for storing Reduce input data corresponding to the Reduce slot can be obtained by multiplying the known memory size with the predetermined coefficient (for example, 0.5 or other coefficients less than 1).

At S470, according to the memory size for storing the input data of the Reduce task determined at S460, and the total data amount of Map output results determined at S450, the number of Reduce tasks for the MapReduce job is determined.

Specifically, the number of Reduce tasks may be equal to the total data amount of Map output results determined at S450 divided by the memory size determined at S460. It can be seen that, when the memory size for storing Reduce input data in the Reduce slot is small, the MapReduce job can be divided into more Reduce tasks, so that the input data to be processed by each Reduce task can be reduced, to meet the small memory capacity of the Reduce slot. In this case, because the memory for storing Reduce input data in the Reduce slot can match with the Reduce input data as much as possible, repeated read/write operations caused by unnecessary spill to disk processes can be avoided to a great extent, and processing efficiency can be improved accordingly.

In the case of applying the MapReduce architecture in a homogeneous network, each Reduce slot may be provided with the same memory size and memory allocation, the Reduce task number calculated at S470 is the Reduce task number actually corresponding to the MapReduce job. That is, in the case of a homogeneous network, one Reduce task determined at S470 corresponds to one Reducer. However, in the case of applying the MapReduce architecture in a heterogeneous network, the Reduce task number determined at S470 may be not equal to the actual Reducer number, as particularly described as follows.

In the case of applying the MapReduce architecture in a heterogeneous network, because Reduce slots may have different memory sizes, memory sizes each being allocated for storing input data of a Reduce task corresponding to each Reduce slot determined at S460 may be different from each other. These memory sizes for storing Reduce input data may have a common divisor. Then, according to an embodiment of this invention, the Reduce task number of the MapReduce job can be determined according to the common divisor of the memory size allocated for storing input data of a Reduce task corresponding to each Reduce slot determined at S460 and the total data amount of Map output results determined at S450. Herein, the Reduce task number is equal to the total data amount of Map output results divided by the above common divisor. The Reduce task number calculated as such is larger than the actual Reducer number.

In this case, according to the relationship between the memory sizes respectively corresponding to each Reduce slot in the heterogeneous network and the above common divisor, more than one Reduce task divided according to the above common divisor can be allocated to one Reducer. Specifically, in response to a Reduce slot being free, according to the memory size that can be allocated for Reduce task storage corresponding to this Reduce slot and the above common divisor, several Reduce tasks are allocated to the Reduce task occupying this Reduce slot, wherein the number of the Reduce tasks is equal to the memory size that can be allocated for storing input data of the Reduce task corresponding to this Reduce slot divided by the above common divisor.

For example, assume there are three Reduce slots in the heterogeneous network, each of them corresponding to a memory size 1200 MB, 800 Mb and 400 MB that can be allocated to a Reduce task, respectively. When the predetermined coefficient is 0.5, the memory size that can be allocated for storing input data of a Reduce task corresponding to each of these three Reduce slots is 600 MB, 400 MB and 200 MB, respectively. Herein, take the greatest common divisor of these three memory sizes which is 200 MB. The number of Reduce tasks can be determined according to the greatest common divisor 200 MB and the total data amount of Map output results. In response to the Reduce slot with 1200 MB being free, three (600 MB/200 MB) Reduce tasks are allocated to this Reduce slot. In response to the Reduce slot with 800 MB being free, two (400 MB/200 MB) Reduce tasks are allocated to this Reduce slot. In response to the Reduce slot with 400 MB being free, one (200 MB/200 MB) Reduce tasks is allocated to this Reduce slot. Certainly, the common divisor may be other common divisors, such as 100 MB, but not the greatest common divisor.

One of the advantages of using the greatest common divisor is to sufficiently use the memory in each computing node. In the case that Reduce slots have been determined, the number of Reduce tasks that can be executed in parallel is also determined. If the input data amount of a Reduce task is too small, the memory in the computing node executing this Reduce task can not be used sufficiently. On the contrary, if the input data amount of a Reduce task is too large, the computing node will spill Reduce task input data to the disk. By performing the partition of Reduce tasks based on a common divisor, appropriate input data can be allocated for a Reduce task occupying a Reduce slot, so as to adapt to the resource situation of the Reduce slot itself, and thus prevent a drop in processing efficiency caused by unnecessary spill to disk processes as much as possible while achieving the sufficient usage of its resources.

According to an embodiment of this invention, in response to the completion of an operation of reading Map output results by a Reduce task occupying a Reduce slot, an operation of reading Map output results by another Reduce task that has not occupied a Reduce slot begins.

In the conventional MapReduce architecture, only a Reduce task that has occupied a Reduce slot can read its corresponding Map output results. That is, only the Reduce task that has occupied a Reduce slot can perform a shuffle operation. After the Reduce task occupying the Reduce slot finishes its operation, it releases the occupied Reduce slot. After the freed Reduce slot is occupied by another Reduce task, Map output results corresponding to this Reduce task can be transmitted to this Reduce task, i.e., a shuffle operation corresponding to the Reduce task occupying the Reduce slot can be performed. Thus, the execution of one MapReduce job may suffer from a larger delay. Only upon a Reduce slot is free, data reading and execution operations of other Reduce tasks can be initiated.

Figure 5:
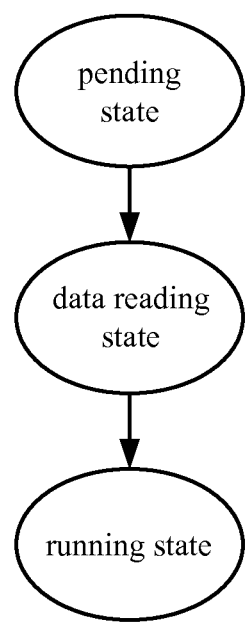
FIG. 5 is an example of state transitions for a Reduce task according to an embodiment of this invention.

According to an embodiment of this invention, in the state machine of a Reduce task, a data reading state can be added between the existing pending state and running state, as shown in FIG. 5. A Reduce task in the data reading state, even though not occupying any Reduce slot, can initiate its shuffle operation. As such, once the Reduce task in the data reading state occupies a Reduce slot, it can immediately proceed to the running state by skipping the step of reading Map output results as in the prior art. Thus, execution time can be saved and processing efficiency can be further improved.

Specifically, a Reduce task in the pending state is a Reduce task not occupying any Reduce slot. In the case that there is one Reduce task, among those ones being occupying Reduce slots, completing its data reading operation, the Reduce function of this Reduce task begins to run, while the Reduce task not occupying any Reduce slot may proceed to the data reading state to read its corresponding Map output results (i.e., the shuffle operation). When there is a Reduce slot freed, under the scheduling of the master node, the Reduce task not occupying any Reduce slot may take over the freed Reduce slot and proceed to the running state to begin the execution of its Reduce function.

In addition, in the case that the shuffle operation of a Reduce task is completed, more than one Reduce task may proceed to the data reading state.

By adding the data reading state for the execution of a Reduce task, as compared to the prior art, corresponding Map output results can be transmitted to a Reduce task not occupying any Reduce slot beforehand, so that in the case that the actual number of Reduce tasks (i.e., the actual number of Reducers) is larger than the number of Reduce slots, the execution delay of all Reduce tasks can be reduced and processing efficiency can be further improved.

Although step S450 is executed after S440 in the method 400, there is not any special restriction about the execution relationship between S450 and S420 to S440, so long as S450 is executed after S410. In addition, this invention does not have limitation on the execution sequence of S450 and S460, so long as S450 and S460 are executed before S470.

Figure 6:
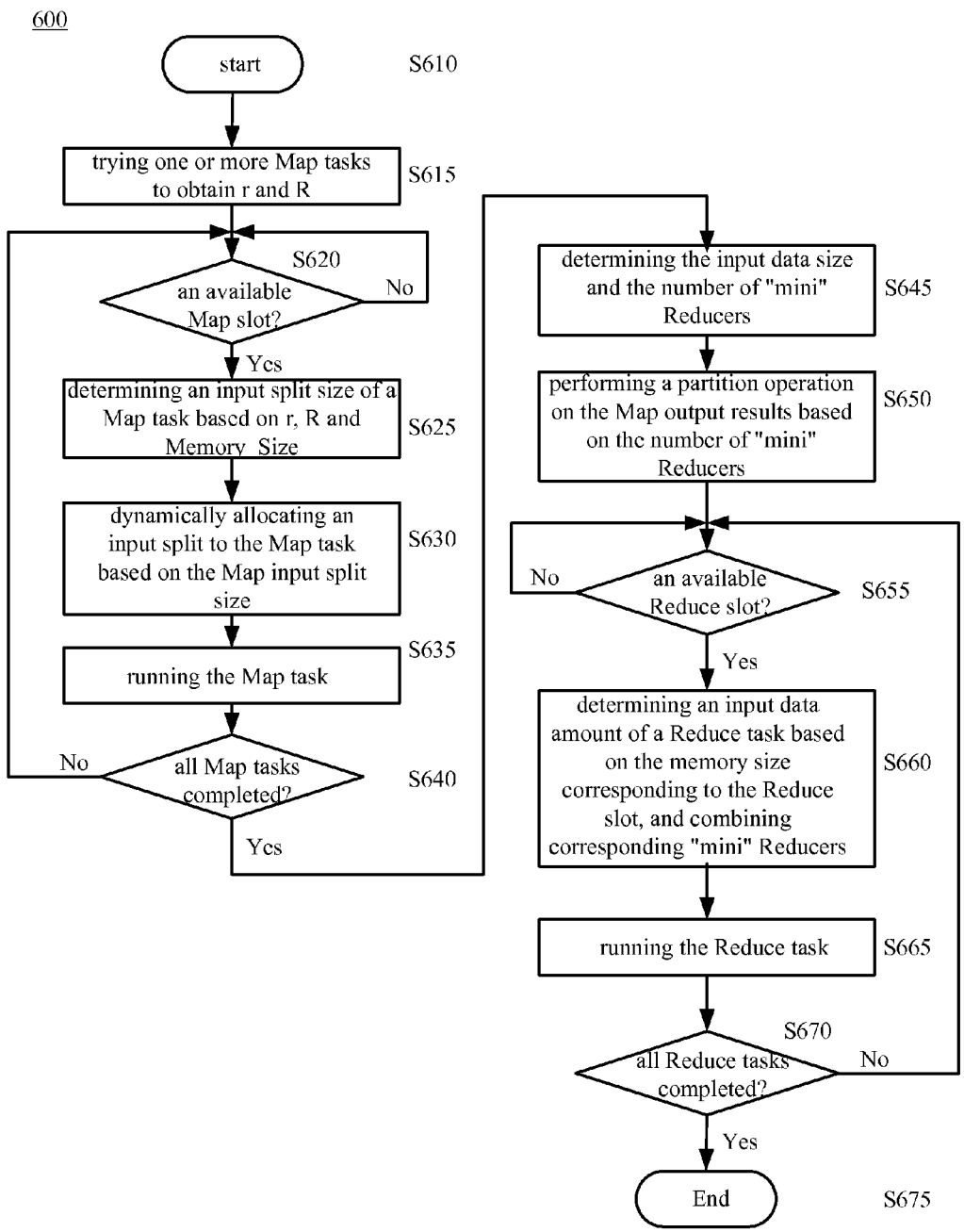
FIG. 6 is a flowchart of an exemplary method for processing a MapReduce job according to the method in an embodiment of this invention.

FIG. 6 specifically shows a flowchart of an exemplary method 600 for processing a MapReduce job using the method according to an embodiment of this invention. With the method 600 of FIG. 6, spill to disk processes in both of Map and Reduce operations can be avoided as much as possible. Herein, the method 600 will be described with a heterogeneous network as an example, which however is also applicable to a homogeneous network. The differences between the two cases will be described in detail hereinafter. It is a matter of course, those skilled in the art may understand that the homogeneous network is a special type of the heterogeneous network, and thus the flow of the method 600 is completely applicable to the homogeneous network. In addition, the method 600 will be described with a master node in the network being the execution subject as an example. However, it easily occurs to those skilled in the art to execute the method 600 by a node other than the master node, or to execute the method 600 by the master node and other node in a coordinate manner.

At S610, the method 600 starts.

At S615, the master node obtains a ratio r of the input data amount and the output data amount of a Map task, and an average size R of a record in Map output results by trying one or more Map tasks.

At S620, the master node determines whether there is an available Map slot, that is, whether there is a free Map slot. If it is determined that there is an available Map slot, the method 600 proceeds to S625; otherwise the method 600 continues with S620.

At S625, the master node determines an input split size for a Map task occupying the Map slot based on r, R, and a available memory size Memory_Size that can be allocated to a Map task corresponding to the Map slot.

In the case of the homogeneous network, S625 can be executed only once and arranged between S615 and S620. Because, in the case of the homogeneous network, it can be considered that each Map slot has the same Map task input data split size.

At S630, based on the calculated Map task input data split size, the master node dynamically allocates data with the input split size in the MapReduce job to the Map task occupying the Map slot.

At S635, the Map task occupying the Map slot runs.

At S640, the master node determines whether all the Map tasks have been executed. If it is determined that all the Map tasks have been executed, the method 600 proceeds to S645; otherwise the method 600 returns to S620 to wait for a free Map slot for the processing of a new Map task.

At S645, according to memory sizes each being able to be allocated for storing Reduce task input data corresponding to each Reduce slot, the master node determines a common divisor of those memory sizes, and takes the quotient of dividing the data amount of the Map output results by the common divisor as the number of "mini" Reducers. The common divisor can be considered as the input data amount of one "mini" Reducer. Herein, the number of "mini" Reducers is a Reducer number calculated under an assumption that the common divisor is the input data amount of a Reducer, and the number of "mini" Reducers may be larger than the number of actually existing Reducers.

Although S645 is executed after S640 in the method 600, the execution sequence of S645 and S615 to S640 is not limited to that, so long as S645 is executed before S650. Because S650 needs to perform a partition operation on the Map output results, it needs to be executed after S640.

In the case of the homogeneous network, because it can be considered that each Reduce slot corresponds to the same memory size that can be allocated to a Reduce task, calculating the common divisor and "mini" Reducer number at S645 is not necessary. In the homogeneous network, at S645, the Reducer number is calculated according to the memory size that can be allocated for storing Reduce input data corresponding to each Reduce slot and the data amount of the Map output results, in which case the calculated Reducer number is equal to the number of actual Reducers.

At S650, the master node performs a partition operation on the Map output results according to the Reduce task number determined at S645.

At S655, the master node determines whether there is an available Reduce slot, that is, whether there is a free Reduce slot. If it is determined that there is an available Reduce slot, the method 600 proceeds to S660; otherwise the method 600 continues with S655.

At S660, according to the memory size Memory_Size that can be allocated to a Reduce task corresponding to the available Reduce slot and a predetermined coefficient less than 1, the master node determines the memory size that can be allocated for storing Reduce input data corresponding to the Reduce slot, and uses this memory size as the input data amount of a Reduce task occupying this Reduce slot. Then, according to the quotient of the input data amount of the Reduce task divided by the common divisor, the master node combines "mini" Reducers with the number equal to the quotient to be allocated to the Reduce task occupying the Reduce slot.

In the case of the homogeneous network, because the Reducer number calculated at S645 is equal to the number of actual Reducers, calculating the number of "mini" Reducers is not necessary, and therefore the combination of a certain number of "mini" Reducers at S645 is not necessary. In the case of the homogeneous network, because each Reduce slot can be considered as having the same resource situation, at S660, the master node determines the memory size that can be allocated for storing Reduce input data corresponding to each Reduce slot, according to Memory_Size that can be allocated to a Reduce task corresponding to each Reduce slot and a predetermined coefficient less than 1. Because this memory size is the same for each Reduce slot, S660 only needs to be executed one time and arranged before S655.

At S665, the Reduce task occupying the Reduce slot runs.

In the homogeneous network, as in the conventional techniques, the Reduce task occupying the Reduce slot is allocated with Reduce input data corresponding to the Reduce task after the partition operation at S650.

At S670, the master node determines whether all the Reduce tasks have been completed. If it is determined that all the Reduce tasks have been completed, the method 600 proceeds to S675; otherwise the method 600 returns to S655.

At S675, the method 600 ends.

Take a homogeneous network as an example to describe the method according to an embodiment of this invention. Assume that r=3 and R=84 bytes per record as probed by running multiple Map tasks in advance. In the homogeneous network, there are four computing nodes available for a MapReduce job, and each computing node has two cores and 1200 MB memory. In addition, the total data amount of the MapReduce job is 10 GB. In addition to R bytes per record, the data structure used in the memory and disk has 16-byte management overhead for each record. When using the method according to an embodiment of this invention, the following can be calculated: Mc=Rc=the number of cores=2*4=8, Memory_Size=1200 MB*4/(8+8)=300 MB, Data_Buffer=300 MB*84/(16+84)=252 MB, Map_input_split_size=252 MB*3=756 MB, the number of Map tasks=10 GB/756 MB=13, input data amount of a Reduce task=10 GB/3=3.33 GB, and the number of Reduce tasks=3.33 GB/(0.5*300 MB)=23.

According to the above method provided in an embodiment of this invention, by allocating input data matched with the memory of a slot occupied by a task to the task according to the memory size corresponding to the slot, unnecessary spill to disk processes can be avoided as much as possible. Meanwhile, parameters can be automatically optimized to achieve the sufficient usage of core resources and memory resources of various slots, and processing efficiency can be improved. Further, by dividing the total memory by (Mc+Rc) to calculate Memory_Size and determining a split size based on Memory_Size, pipelined MapReduce operations can be supported. Furthermore, even in a heterogeneous network, by allocating input data amount as required according to resource situations of various slots, unnecessary spill to disk processes can also be avoided, and at the same time, processing efficiency can be improved and resources waste can be avoided.

The method for resource management in the MapReduce architecture according to an embodiment of this invention has been described above. Next, an apparatus for resource management in the MapReduce architecture according to an embodiment of this invention and the structural block diagram of a MapReduce architectural system will be described.

Figure 7:
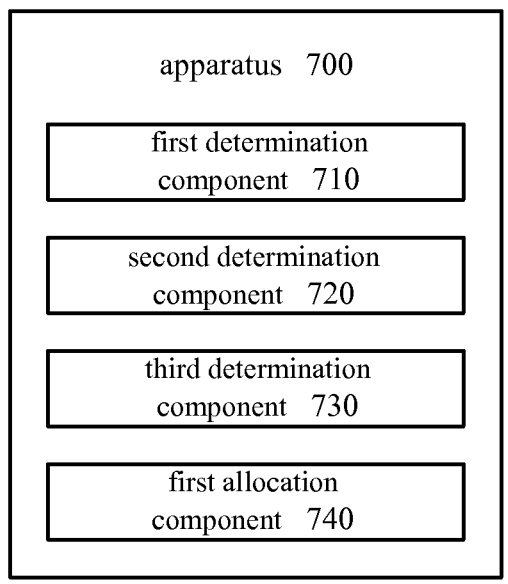
FIG. 7 is a structural block diagram of an apparatus for resource management in the MapReduce architecture according to an embodiment of this invention.

As shown in FIG. 7, an apparatus 700 for resource management in the MapReduce architecture according to an embodiment of this invention comprises a first determination component 710, a second determination component 720, a third determination component 730, and a first allocation component 740. The first determination component 710 can be configured to determine a ratio r of an input data amount of a Map task and an output data amount of the Map task and an average size R of a record in Map output results. The second determination component 720 can be configured to determine a memory size Memory_size that can be allocated to the Map task corresponding to a Map slot. The third determination component 730 can be configured to according to the determined r, R and Memory_size, determine an input split size appropriate for the Map task.

The first allocation component 740 can be configured to allocate an input split with the input split size in a MapReduce job to be processed to the Map task occupying the Map slot.

Reference can be made to the description of the above method 200 for the above and/or other operations and functions of the first determination component 710, the second determination component 720, the third determination component 730, and the first allocation component 740, which will not be specifically described herein to avoid repetition.

According to the above apparatus provided in an embodiment of this invention, by pre-estimating a memory size that can be allocated to a Map task corresponding to a Map slot, an input split with a matched size can be allocated to the Map task occupying the Map slot according to the memory size, so that multiple disk spills caused by an input split size not matching with a memory size as well as repeated disk read/write processes resulted in this case can be avoided as much as possible. Therefore, processing efficiency for the Map task can be improved, and resources waste can be avoided.

Figure 8:
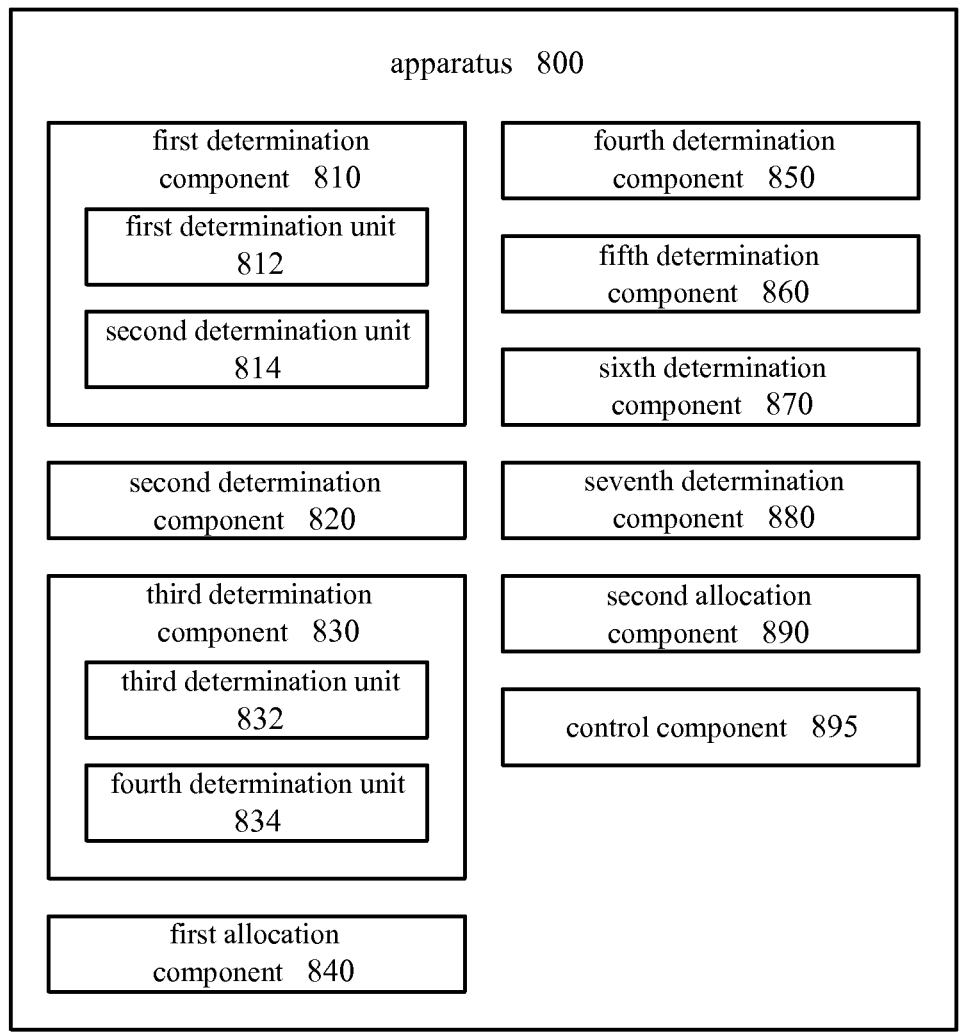
FIG. 8 is a structural block diagram of another apparatus for resource management in the MapReduce architecture according to an embodiment of this invention.
Figure 9:
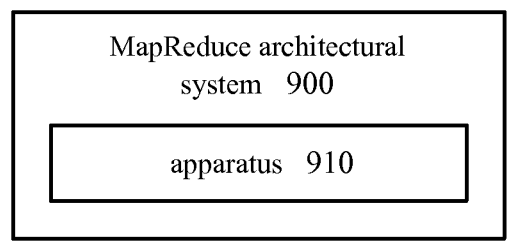
FIG. 9 is a structural block diagram of a MapReduce architectural system according to an embodiment of this invention.

FIG. 8 shows a structural block diagram of another apparatus 800 for resource management in the MapReduce architecture. The first determination component 810, the second determination component 820, the third determination component 830, and the first allocation component 840 in the apparatus 800 are substantially the same as the first determination component 710, the second determination component 720, the third determination component 730, and the first allocation component 740 in the apparatus 700, respectively.

According to an embodiment of this invention, the first determination component 810 may comprise at least one of a first determination unit 812 and a second determination unit 814. The first determination unit 812 can be configured to execute one or more Map tasks in advance, and determine r and R according to the obtained results after the execution. The second determination unit 814 can be configured to determine r and R according to log information related to Map tasks that have been executed historically.

According to an embodiment of this invention, the third determination component 830 may comprise a third determination unit 832 and a fourth determination unit 834. The third determination unit 832 can be configured to according to R, management overhead corresponding to the record in the Map output results, and Memory_Size, determine a memory size Data_Buffer, which is a portion of Memory_Size, for storing data other than the management overhead. The fourth determination unit 834 can be configured to determine the input split size appropriate for the Map task according to Data_Buffer and r.

According to an embodiment of this invention, in the case of applying the MapReduce architecture in a homogeneous network, the second determination component 820 can be configured to determine Memory_Size according to the total number of slots available for the parallelized execution of Map tasks and the total amount of memory available for the parallelized execution of Map tasks.

According to an embodiment of this invention, the apparatus 800 may further comprise a fourth determination component 850. The fourth determination component 850 can be configured to determine the number of Map tasks for the MapReduce job according to the total input data amount of the MapReduce job and the input split size.

According to an embodiment of this invention, in the case of applying the MapReduce architecture in a heterogeneous network, the second determination component 820 can be configured to in response to a Map slot being free, determine a memory size corresponding to the Map slot as Memory_Size.

According to an embodiment of this invention, the apparatus 800 may further comprise a fifth determination component 860, a sixth determination component 870, and a seventh determination component 880. The fifth determination component 860 can be configured to determine the total data amount of the Map output results of the MapReduce job according to r and the total input data amount of the MapReduce job. The sixth determination component 870 can be configured to determine a memory size that can be allocated for storing input data of a Reduce task corresponding to a Reduce slot. The seventh determination component 880 can be configured to, according to the memory size for storing the input data of the Reduce task and the total data amount of the Map output results, determine the number of Reduce tasks for the MapReduce job.

According to an embodiment of this invention, in the case of applying the MapReduce architecture in a homogeneous network, the sixth determination component 870 can be configured to, according to the total number of slots available for the parallelized execution of Reduce tasks, the total amount of memory available for the parallelized execution of Reduce tasks, and a predetermined coefficient less than 1, determine the memory size that can be allocated for storing the input data of the Reduce task corresponding to the Reduce slot.

According to an embodiment of this invention, in the case of applying the MapReduce architecture in a heterogeneous network, the sixth determination component 870 can be configured to, for each Reduce slot for the execution of the MapReduce job in the heterogeneous network, according to the memory size that can be allocated to the Reduce task corresponding to the Reduce slot and a predetermined coefficient less than 1, determine the memory size that can be allocated for storing the input data of the Reduce task corresponding to the Reduce slot. Further, the seventh determination component 880 can be configured to according to a common divisor of the memory sizes each of which can be allocated for storing the input data of the Reduce task corresponding to each Reduce slot and the total data amount of the Map output results, determine the number of Reduce tasks for the MapReduce job. In this case, the apparatus 800 may further comprises a second allocation component 890. The second allocation component 890 can be configured to in response to a Reduce slot being free, according to the memory size that can be allocated for storing the input data of the Reduce task corresponding to the Reduce slot and the common divisor, allocate several Reduce tasks to the Reduce task occupying the Reduce slot, wherein the number of the several Reduce tasks is equal to the quotient obtained by dividing the memory size that can be allocated for storing the input data of the Reduce task corresponding to the Reduce slot by the common divisor.

According to an embodiment of this invention, the common divisor may be 100 MB or the greatest common divisor.

According to an embodiment of this invention, the predetermined coefficient may be 0.5.

According to an embodiment of this invention, the apparatus 800 may further comprise a control component 895. The control component 895 can be configured to in response to an operation of reading the Map output results by a Reduce task occupying a Reduce slot being completed, initiate an operation of reading the Map output results by another Reduce task which has not yet occupied a Reduce slot.

Reference can be made to the description of the above method 200, 300, 400 and 600 as well as the related description of FIG. 5 for the above and/or other operations and functions of the first determination unit 812, the second determination unit 814, the second determination component 820, the third determination unit 832, the fourth determination unit 834, the fourth determination component 850, the fifth determination component 860, the sixth determination component 870, the seventh determination component 880, the second allocation component 890, and the control component 895, which will not be specifically described herein to avoid repetition.

According to the above apparatus provided in an embodiment of this invention, with the forth determination component, the fifth determination component, and the sixth determination component, spill to disk processes in the Reduce operation can be further avoided to further improve processing efficiency. With the control component, the delay for executing all the Reduce tasks can be reduced, so that processing efficiency can be further improved. In addition, by allocating input data matched with the memory of a slot occupied by a task to the task according to the memory size corresponding to the slot, unnecessary spill to disk processes can be avoided as much as possible. Meanwhile, parameters can be automatically optimized to achieve the sufficient usage of core resources and memory resources of various slots, and processing efficiency can be improved. Further, with the apparatus provided in an embodiment of this invention, pipelined MapReduce operations can be supported. Furthermore, even in a heterogeneous network, by allocating input data amount as required according to resource situations of various slots, unnecessary spill to disk processes can also be avoided, and at the same time, processing efficiency can be improved and resources waste can be avoided.

The above apparatus 700 and 800 can be implemented as a separated software package, a plug-in, or the lick, and also can be completely or partially integrated into the MapReduce architecture.

In addition to the existing components, the MapReduce architectural system 900 may comprise an apparatus 910 for resource management, which may be the apparatus 700 or 800 described above.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for resource management in MapReduce architecture, the method comprising the steps of:
   determining a ratio r of an input data amount of a Map task and an output data amount of the Map task and an average size R of a record in Map output results;
   determining a memory size Memory_size that can be allocated to the Map task corresponding to a Map slot;
   determining an input split size appropriate for the Map task according to the determined r, R and Memory_size; and
   allocating an input split with the input split size in a MapReduce job to be processed to the Map task occupying the Map slot.

2. The method according to claim 1, wherein the step of determining a ratio r of an input data amount of a Map task and an output data amount of the Map task and an average size R of a record in Map output results comprises at least one of:
   executing one or more Map tasks in advance, and determining r and R according to the obtained results after the execution; and
   determining r and R according to log information related to Map tasks that have been executed historically.

3. The method according to claim 1, wherein the step of determining an input split size appropriate for the Map task according to the determined r, R and Memory_size comprises the steps of:
   determining a memory size Data_Buffer, which is a portion of Memory_Size, for storing data other than the management overhead according to R, management overhead corresponding to the record in the Map output results, and Memory_Size; and
   determining the input split size appropriate for the Map task according to Data_Buffer and r.

4. The method according to claim 1, wherein, in the case of applying the MapReduce architecture in a homogeneous network, the step of determining a memory size Memory_size that can be allocated to the Map task corresponding to a Map slot comprises the step of:
   determining Memory_Size according to the total number of slots available for the parallelized execution of Map tasks and the total amount of memory available for the parallelized execution of Map tasks.

5. The method according to claim 4, wherein the method further comprises the step of:
   determining the number of Map tasks for the MapReduce job according to the total input data amount of the MapReduce job and the input split size.

6. The method according to claim 1, wherein, in the case of applying the MapReduce architecture in a heterogeneous network, the step of determining a memory size Memory_size that can be allocated to the Map task corresponding to a Map slot comprises:
   determining a memory size corresponding to the Map slot as Memory_Size in response to a Map slot being free.

7. The method according to claim 1, wherein the method further comprises the steps of:
   determining the total data amount of the Map output results of the MapReduce job according to r and the total input data amount of the MapReduce job;
   determining a memory size that can be allocated for storing input data of a Reduce task corresponding to a Reduce slot; and
   determining the number of Reduce tasks for the MapReduce job according to the memory size for storing the input data of the Reduce task and the total data amount of the Map output results.

8. The method according to claim 7, wherein, in the case of applying the MapReduce architecture in a homogeneous network, the step of determining a memory size that can be allocated for storing input data of a Reduce task corresponding to a Reduce slot comprises:
   determining the memory size that can be allocated for storing the input data of the Reduce task corresponding to the Reduce slot according to the total number of slots available for the parallelized execution of Reduce tasks, the total amount of memory available for the parallelized execution of Reduce tasks, and a predetermined coefficient less than 1.

9. The method according to claim 7, wherein, in the case of applying the MapReduce architecture in a heterogeneous network, the step of determining a memory size that can be allocated for storing input data of a Reduce task corresponding to a Reduce slot comprises:
   determining the memory size that can be allocated for storing the input data of the Reduce task corresponding to the Reduce slot, for each Reduce slot for the execution of the MapReduce job in the heterogeneous network, according to the memory size that can be allocated to the Reduce task corresponding to the Reduce slot and a predetermined coefficient less than 1;
   determining the number of Reduce tasks for the MapReduce job according to the memory size for storing the input data of the Reduce task and the total data amount of the Map output results, which includes determining the number of Reduce tasks for the MapReduce job according to a common divisor of the memory sizes each of which can be allocated for storing the input data of the Reduce task corresponding to each Reduce slot and the total data amount of the Map output results; and
   allocating several Reduce tasks to the Reduce task occupying the Reduce slot in response to a Reduce slot being free, according to the memory size that can be allocated for storing the input data of the Reduce task corresponding to the Reduce slot and the common divisor, after determining the number of Reduce tasks for the MapReduce job;
   wherein the number of the several Reduce tasks is equal to the quotient obtained by dividing the memory size that can be allocated for storing the input data of the Reduce task corresponding to the Reduce slot by the common divisor.

10. The method according to claim 1, wherein the method further comprises the step of:
   initiating an operation of reading the Map output results by another Reduce task which has not yet occupied a Reduce slot in response to an operation of reading the Map output results by a Reduce task occupying a Reduce slot being completed.

* * * * *